INVENTOR.
ROBERT J. WRIGHTON
BY
ATTORNEY

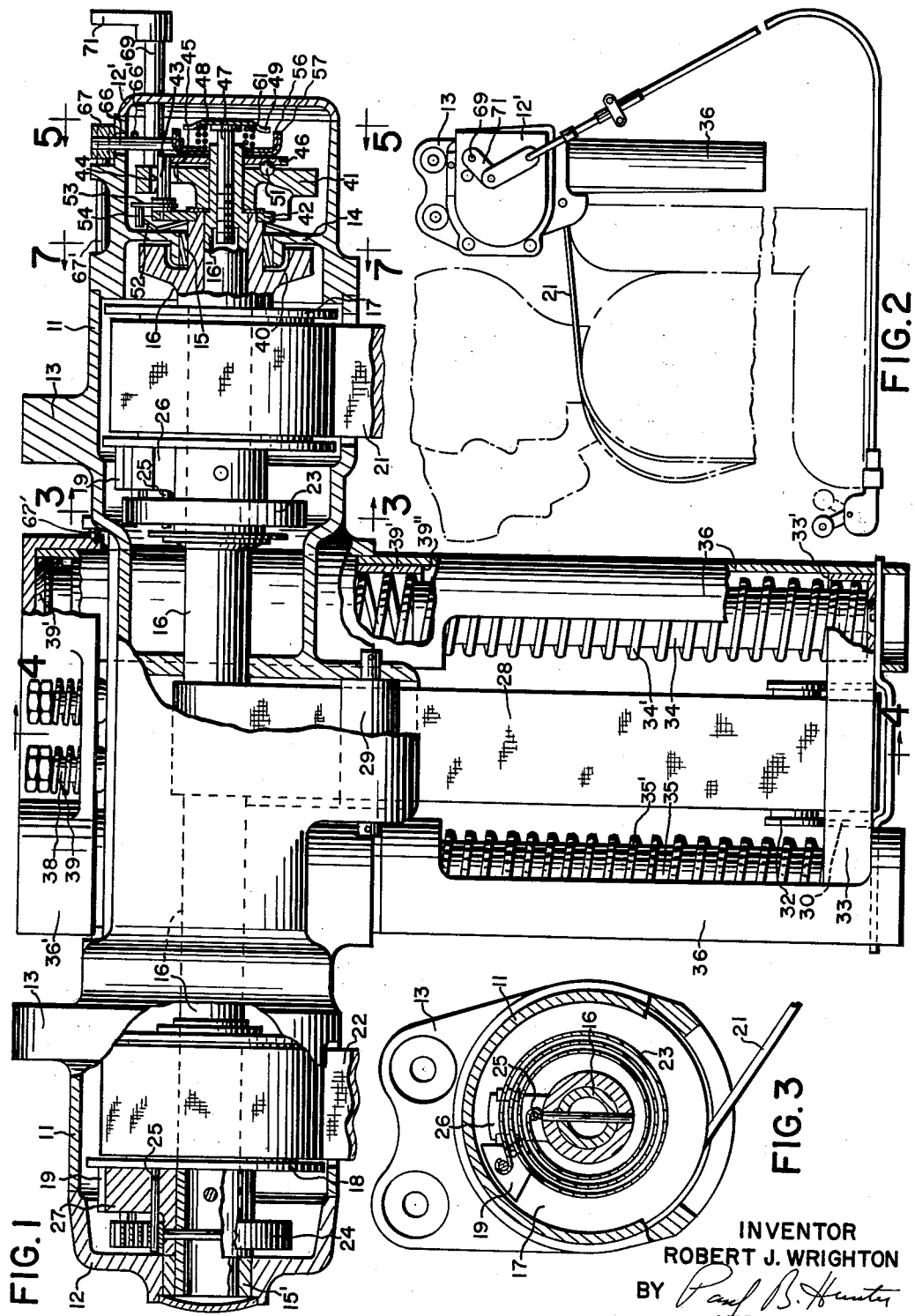

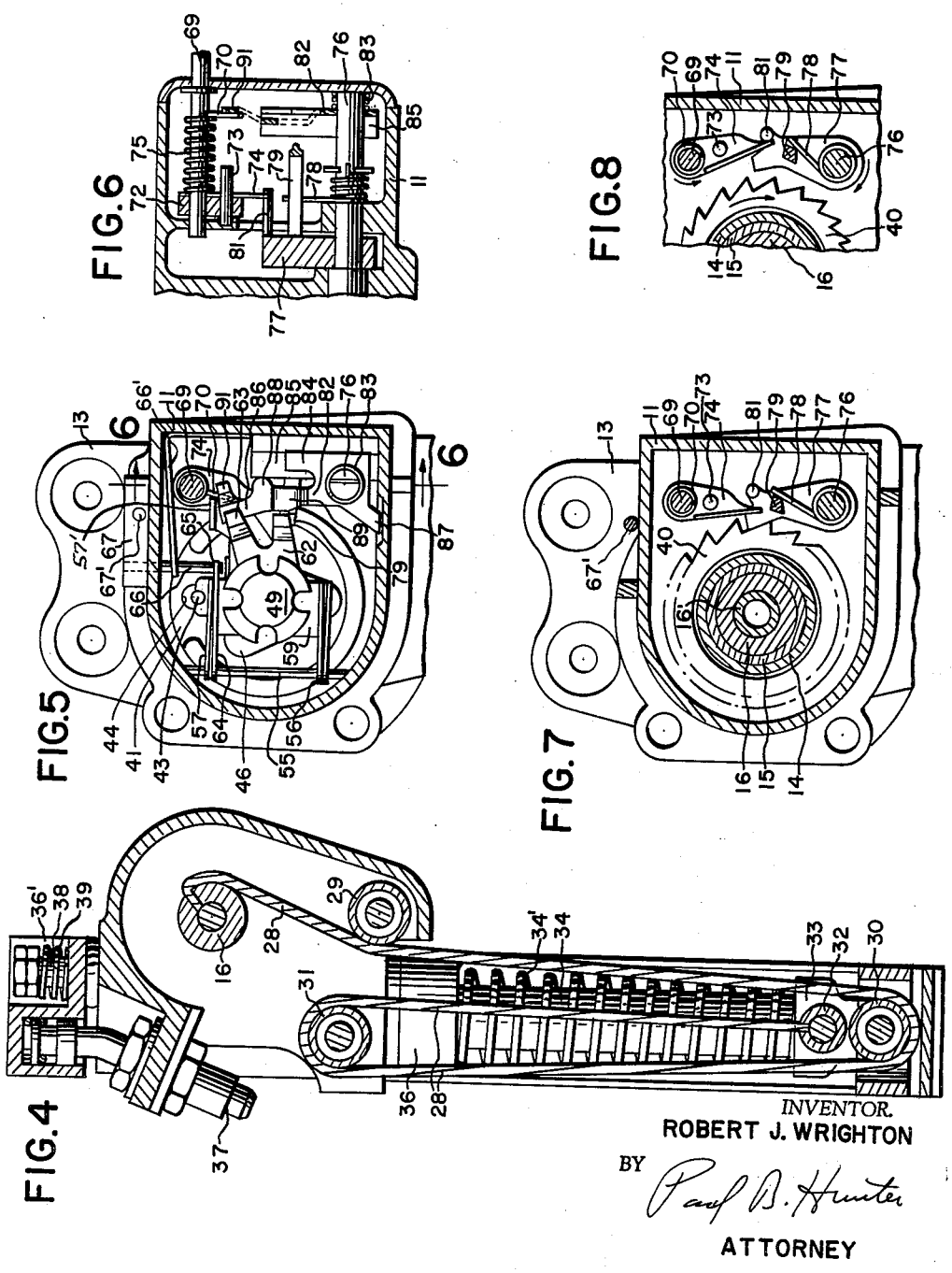

United States Patent Office 3,105,662
Patented Oct. 1, 1963

3,105,662
SAFETY HARNESS DEVICE
Robert J. Wrighton, Newport Beach, Calif., assignor to Pacific Scientific Company, San Francisco, Calif., a corporation of California
Filed June 19, 1961, Ser. No. 117,957
15 Claims. (Cl. 244—122)

This invention relates, in general, to safety harness devices for use in protecting persons in moving vehicles and, more particularly, to a novel improved inertia-operated safety device utilized to automatically lock persons, such as airplane pilots, in their seats during crashes and the like.

The present safety harness device is responsive to the rate of acceleration of the pilot, passenger or user with respect to his seat and operates directly in response to the accelerations exerted on a cable or webbing resulting from forces applied to the webbing through the pilot's shoulder harness by movements of his body, the device operating automatically upon sudden violet movement of the body to secure the pilot or user safely in his seat. This present invention discloses a novel type of such inertia-operated device which incorporates novel improved features over prior art safety devices.

The principal object of the present invention is to provide an exceedingly lightweight, rugged and dependable safety harness device operating on the principle of rate of acceleration of the harness cable or webbing to retain the user in his seat in the event of sudden or dangerous movement of the vehicle, the device incorporating various safety features enhancing its dependability in use.

One feature of the present invention is the provision of an inertia-operated safety device wherein a pair of tension members or webbings are utilized for securing the pilot in his seat, the webbings being locked up automatically should they exceed a certain outward acceleration due to the pull exerted thereon by the pilot or user thereof, the safety device being provided with a pair of reels for the webbings, the reels permitting a small relative rotation therebetween to allow one webbing to move relative to the other by a small amount to allow shoulder freedom for the pilot.

Another feature of the present invention is the provision of a piston-controlled wind-up mechanism for the safety device whereby forced wind-up of the device may be accomplished by a charged gas pressure system, putting high tension loads into the harness to restrain the pilot in emergency conditions.

Another feature of the present invention is the provision of an inertia-operated safety device provided with a novel automatic unlock mechanism for automatically unlocking the device when the acceleration force causing the lock-up has been removed from the webbing or cable.

These and other features and advantages of this invention will become apparent after perusal of the following description of this invention disclosed in the drawings wherein:

FIG. 1 is a plan view partly cut away and partly in section of one embodiment of the present invention utilized in a reel type of safety device having a pair of webbing tension members;

FIG. 2 is an end view of the apparatus showing the manner in which it is mounted on the seat in a vehicle;

FIG. 3 is a cross-section view of the apparatus taken along section line 3—3 of FIG. 1 in the direction of the arrows;

FIG. 4 is a cross-section view of the apparatus taken along section line 4—4 in FIG. 1;

FIG. 5 is a cross-section view of the apparatus taken along section line 5—5 of FIG. 1;

FIG. 6 is a cross-section of the device taken along section line 6—6 in FIG. 5;

FIG. 7 is a cross-section view of the novel device taken along section line 7—7 in FIG. 1 showing the device in its locked position;

FIG. 8 is a cross-section view of the device similar to FIG. 7 with the device in the unlocked position;

Figure 9:
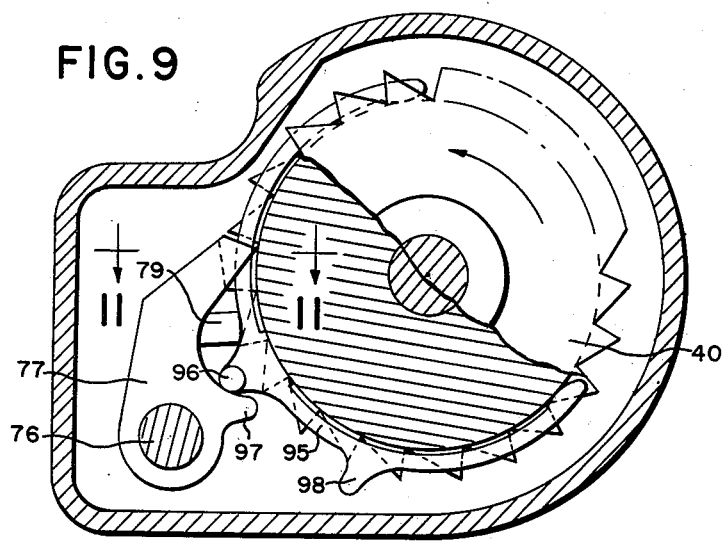
Figure 10:
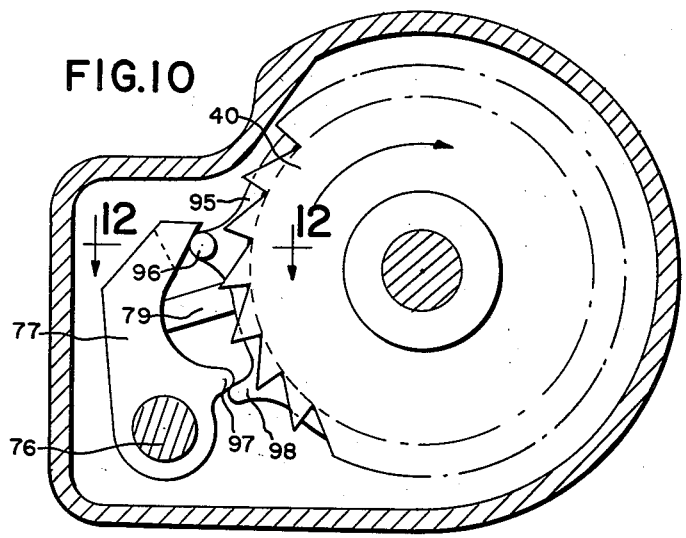
Figure 11:
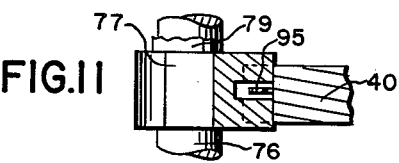
Figure 12:
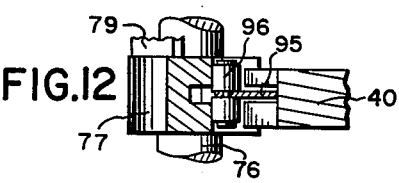

FIGS. 9 and 10 are cross-section views of this novel device wherein an automatic unlocking mechanism is disclosed for use at times in lieu of the manual unlock mechanism, and FIGS. 11 and 12 are cross-section views of a portion of the device of FIGS. 9 and 10, respectively, taken along the section lines shown.

Similar characters of reference are used in the above figures to designate corresponding parts.

Although the present embodiment is a reel and webbing type of inertia-operated safety device it should be understood that this invention applies equally well to reel and cable types as well as other types of safety devices. A complete detailed description of the construction of this device will first be given, followed by an explanation of its operation. Safety reels of this general type have been disclosed and claimed in U.S. patent No. 3,018,065 dated January 23, 1962, Clifford E. Cushman and Robert J. Wrighton, inventors, entitled Safety Harness Device. Certain of the structural elements found in the reel of the present application are also shown and described in the above patent.

Referring now to the drawings, this safety apparatus comprises a metallic casing 11 as of aluminum alloy having removable end covers 12 and 12' secured thereon. Integral lugs 13 are provided on the casing 11 for mounting the safety device on a seat or the like.

Located within the casing 11 is a wall 14 having a central opening therein which serves to mount a bearing 15 for one end of the webbing reel shaft 16, the opposite end of reel or shaft 16 being rotatably mounted in a bearing 15' in the end cover 12. A pair of strap reels 17 and 18 are rotatably mounted on the shaft 16, each reel having a stop member 19 secured thereto and extending from one side thereof (see FIG. 3). The two webbing straps 21 and 22, the outer ends of which are adapted to extend over the pilot's shoulders and to be coupled to the harness of the pilot, are secured at their inner ends to the reels 17 and 18, respectively.

Spiral springs 23 and 24 encircle the shaft 16, the inner ends of the springs 23 and 24 being secured by means of pins 25 to lugs 26 and 27, respectively, secured on the shaft 16 and the outer ends being secured to the stop members 19 on the reels 17 and 18, respectively. The springs 23 and 24 are so tensioned as to rotate the reels 17 and 18 in a strap wind-up direction on the shaft 16 (clockwise as shown in FIG. 3).

The central portion of the shaft 16 has the end of a strap 28 secured therein, the strap extending over idler rollers 29, 30 and 31 and having its other end secured in a retainer member 32 which is secured to a yoke member 33, the yoke 33 also carrying roller 30. The yoke 33 is secured at its ends to a pair of hollow spring guides 34 and 35 within manifold assembly tubes 36. A pair of springs 34' and 35' are tensioned against yoke 33 so as to urge it to its outermost position as shown in FIGS. 1 and 4, the strap 28 being unwound from shaft 16 and thus the reels 17 and 18 being in their fully wound-up position. A manifold 36' is mounted on the body 11 by means of a pair of bolts 38 and springs 39, the manifold 36' covering the upper ends of manifold tubes 36. A pair of hollow cylindrical pistons 39' are positioned in the tubes 36, the upper ends of the springs 34' and 35' fitting within the pistons and urging them to their uppermost position. A fitting 37 is provided by which a charged gas container may be coupled to the manifold 36' for forced webbing wind-up as subsequently described. Integral with the shaft 16 is a ratchet wheel 40.

An annular flywheel 41 is rotatably mounted on an end extension member 16' of the shaft 16. Fixedly secured on the shaft extension 16' so as to rotate therewith is a torque plate 42 having a torque pin 43 embedded therein. The torque pin 43 extends through an opening 44 in the flywheel and is snugly fitted within a slot 45 in a substantially triangular-shaped thrust plate 46 which is rotatably mounted on the shaft extension 16'. A compensator screw 47 is screwed into a threaded bore in one end of the shaft extension 16'. A helical thrust plate spring 48 encircles the screw 47 and is compressed between the head 49 of screw 47 and the thrust plate 46. Three steel balls 51 are sandwiched between the thrust plate 46 and the surface of the flywheel 41, the balls nestling in indentations in the thrust plate and flywheel surfaces. Thus, the thrust plate 46 is at all times pressed against the steel balls 51, which in turn are pressed against the flywheel 41.

An annular anti-lock spring member 52 (see FIG. 1) is rotatably mounted on the shaft 16 between the torque plate 42 and wall 14. An anti-lock lever 53 is pivotally mounted on the torque pin 43, the lever 53 having a small drive pin 54 embedded therein. The outer end of the drive pin 54 extends into a slot in spring member 52. The lever 53 is adapted to engage one edge of an opening cut into the periphery of the flywheel 41.

A sear pivot pin 55 is mounted in the casing 11 off to one side of the main axis of the shaft 16 (see particularly FIG. 5). A U-shaped sear 56 is pivotally mounted on pin 55 and a second U-shaped sear 57 is also pivotally mounted on pin 55 straddling the sear 56, this second sear being provided with an extension arm and cam 57'. The shaft extension 16' extends through openings in the base surface 59 of sear 56 and also sear 57. A helical sear spring 61 encircles the compensator screw 47 and thrust plate spring 48 and is compressed between the head 49 of the screw 47 and the base surface 59 of the sear 56, the undersurface of said sear base 59 having a dimple (not shown) which presses firmly against the second sear 57, which in turn presses against the plate 46. Two integral fingers 62 and 63 extend from the base 59 of sear 56.

One leg 64 of the sear 56 is provided with a projection 65 adapted to be engaged by a spring-loaded pin 66 secured in a slidable locking member 67 external of the casing 11. The pin is spring-loaded to the left as viewed in FIG. 1 by spring 66'. The locking member 67 is secured on one end of a rod 67', the other end of rod 67' being tapered and nestling in an indentation in the manifold 36'.

A main control shaft 69 is rotatably mounted in the casing 11 and is secured to an external control lever 71 which, as will be explained subsequently, serves as the main control for manually locking and releasing this safety device. An inner control lever 72 (see FIG. 6) is fixedly secured to the shaft 69, the outer end of the lever 72 having a control shaft torque pin 73 embedded therein. A dog retraction lever 74 is loosely mounted on the main control shaft 69 adjacent the inner control lever 72, the control shaft torque pin 73 extending through a slightly enlarged opening in the dog retraction lever 74. A control shaft spring 75 is compressed between a pin 70 mounted in control shaft 69 and the dog retraction lever 74. Thus, dog retraction lever 74 may not rotate relative to shaft 69, except very slightly, since the opening in lever 74 accommodating torque pin 73 is slightly enlarged, but lever 74 may move longitudinally relative to shaft 69 against the tension of spring 75 for reasons set forth hereinafter. The outer end of pin 70 is adapted to engage cam 57' on sear 57 and surface 91 of anti-rebound lever 82.

A lock dog shaft 76 is fixedly secured within the casing 11 off to one side of the extension shaft 16' (see FIGS. 5 and 6). A lock dog 77 is rotatably mounted on the lock dog shaft 76 in a position to engage the teeth on ratchet wheel 40 in locking fashion. A spring 78 is provided encircling shaft 76 and engaging an elongated finger 79 integral with and extending from the lock dog 77, the spring being tensioned so as to urge the lock dog 77 into locking engagement with the ratchet wheel 40. The outer end of the elongated finger 79 is crooked slightly and engages the outer end of finger 62 on sear 56. A second finger 81 integral with the lock dog 77 extends out from the dog, its tapered end surface engaging the outer end of dog retraction lever 74.

An anti-rebound lever 82 is movably mounted on lock dog shaft 76, a spring 83 urging the lever to the left as viewed in FIG. 6. A projection 84 on lever 82 forms a stop against the internal surface 85 of casing 11 to permit the free end 86 of lever 82 to drop only a fixed distance. Slight extensions 87 and 88 of lever 82 engage inner surfaces of casing 11 to prevent any rotational movement of lever 82 on shaft 76. A slight projection 89 on the lever 82 is adapted to ride on the outer end of finger 79 of lock dog 77 when lock dog 77 is not engaging the ratchet wheel 40 and to drop down behind the finger 79 when the lock dog rotates into engagement with the ratchet wheel, as will be subsequently explained. The pin 70 in control shaft 69 is arranged to engage the tilted end 91 of the anti-rebound lever 82.

A detailed description of the operation of this novel device embodying the present invention will now be given with reference to its use by a pilot in an aircraft. When the pilot first pulls the straps 21 and 22 of the unlocked safety reel device over his shoulders and connects their ends to his harness, the webbing straps unwind from the webbing reels 17 and 18, the reels rotating counterclockwise (FIG. 3) until the stop members 19 engage the right-hand surface of the lugs 26 and 27. As the pilot moves about in his seat in a normal manner to control his craft his shoulders move and pull on the two webbing straps 21 and 22 to produce further rotation of the reels 17 and 18 in the unwind direction, rotating the shaft 16 and shaft extension 16' and with it the integral ratchet wheel 40. As the shaft extension 16' rotates, it carries the torque plate 42 with it, and through torque pin 43, also rotates the thrust plate 46. Since the thrust plate 46 is pressed against the steel balls 51 and thus engages the flywheel 41, the flywheel is rotated along with the shaft 16. As the shaft 16 rotates, and straps 21 and 22 extend, it winds up the strap 28 thereon, the yoke 33 moving toward the shaft 16 and pushing the spring guides 34 and 35 into their manifold tubes 36 against the pressure of the springs 34' and 35'.

In winding up, when the pilot's force is relaxed on the webbing straps 21 and 22, the power springs 34' and 35' force the yoke 33 downward as viewed in FIG. 1 to cause the strap 28 to unwind from the shaft 16 and thus rotate the shaft 16 clockwise (FIG. 3), the lugs 26 and 27 driving the stops 19 and thus rotating the reels 17 and 18 in a strap wind-up direction.

Should the pilot desire to secure himself safely in his seat when, for example, a crash is imminent, he leans back in his seat and the slack in the two harness straps 21 and 22 is taken up by the safety device. The pilot then operates the main control lever shaft 69 by a suitable control cable (see FIG. 2), thereby rotating the inner control lever 72 such that the control shaft pin 70 engages the tilted outer end 91 of anti-rebound lever 82 and slides thereunder, raising lever 82 and in turn raising the finger 63 and with it the finger 62 until the end of spring-loaded finger 79 on lock dog 77 can slip under finger 62, thus permitting lock dog 77 to rotate counterclockwise, as viewed in FIG. 7, into locking engagement with the teeth of ratchet wheel 40. The lock dog retraction lever 74 rotates with the pin 73 and rides up and over the inclined end surface of the lock dog finger 81. If the pilot manually locks the device while leaning forward, the power springs 34' and 35' will still rotate the shaft 16 when the pilot sits back, thereby to reel in the webbing slack, the lock dog 77 falling in behind each successive ratchet tooth.

This device will thereafter remain locked until the inner control lever 72 is manually rotated to release the device. When rotated in the release direction the outer end of lock dog retraction lever 74 engages the back side of the inclined lock dog finger 81 and drives the finger 81, and thus the lock dog 77, back to the release position where the sear finger 62 falls down behind the projecting finger 79 to hold the lock dog in the released position shown in FIG. 8.

The apparatus of this invention will automatically operate to lock up the webbing 21 and 22 during crashes and the like if the pilot does not manually lock it. This safety device is so arranged that when any loading on the webbing 21 and 22 causing an acceleration of a particular number of G's or over occurs, depending on the setting of the device, this webbing will be locked up. Assume that the aircraft in landing strikes an object and decelerates rapidly, pitching the pilot forward in his seat, or that the craft yaws or descends suddenly, so that the pilot's body exerts a loading of this particular number of G's acceleration on the webbing. When the sharp jerk occurs on the webbing it tends to rotate reels 17 and 18, whose drive lugs 26 and 27 are normally engaged with 19, the shaft 16, torque plate 42 and, through pin 43, thrust plate 46, at a rapid rate of acceleration. The thrust plate 46, through steel balls 51, tends to rotate the flywheel 41 along with the shaft 16, but this flywheel is made of a relatively heavy metal mass and it tends to remain stationary when the force is first applied. This tendency of the flywheel to remain stationary overcomes the spring-loading force of the thrust plate and there is, therefore, a relative rotational movement between the thrust plate 46 and the flywheel 41, and this causes the thrust plate to ride up on the steel balls and move to the right as viewed in FIG. 1. The thrust plate 46, through sear 57, bears against the dimple in sear 56, thus rotating sear 56 about its pivot pin 55 against the tension of sear spring 61 and spring 48. The sear finger 62 is thus disengaged from the lock dog finger 79 and the lock dog 77 rotates under pressure of spring 78 to engage the ratchet teeth and thus locks the ratchet wheel 40 to prevent paying out of webbings 21 and 22, and hence retains the user in his seat. In this automatically-locked position the apparatus will still reel in the two webbings should the user move back in his seat in the same mannner as explained above when manually locked.

The springs 61 and 48 are utilized to control the exact number of G's of acceleration on the webbing which are necessary to lock this safety device automatically. The tension of springs 61 and 48 may be varied by screwing the compensation screw 47 into or out of the shaft 16' to increase or decrease the tension, and thus raise or lower the G value of operation. The screw 47 may be rotated in 90° segments and held in position by means of the holding pin on the cover 12' (not shown). The components of this safety device may be selected as to size, weight, etc., so that the device may cover wide ranges of accelerations. In one embodiment of this device constructed, the locking acceleration was set at 2 G's.

To release from the automatic lock position the pilot rotates the lever device 71 to the manual lock position, such that the lock dog retraction lever 74 rides up and over the inclined end of lock dog finger 81. Reverse rotation of lever 74 then causes the retraction lever 74 to engage the finger 81 and rotate the lock dog 77 to its release position, where sear finger 62 falls behind the projecting finger 79 to hold the lock dog in the released position.

This safety device is provided with an anti-rebound means for preventing the lock dog 77, once it has been freed to contact the ratchet wheel 40 and lock this device, from falsely releasing, that is, returning to the normal unlocked position before manual release by the pilot. This false release could possibly occur, for example, if the device were locked initially with a portion of the webbings 21 and 22 unwound from the shaft reels 17, 18. When the shaft 16 rotates under the power of springs 34', 35' to retract the straps, the lock dog 77 rides over the teeth of the ratchet wheel 40 and has a tendency to bounce. If the lock dog were to bounce high enough and finger 79 were to move out from under sea finger 62, the device would be released. Anti-rebound lever 82 prevents such false operation. The central section of this lever 82 rests on the end of lock dog finger 79 under the pressure of springs 83 when the lock dog 77 is in its normal unlocked position. When the lock dog rotates into contact with the ratchet wheel 40, however, the projection 89 on spring-loaded lever 82 drops behind the finger 79 and prevents the finger 79 from subsequently moving out from under the sear finger 62. When control shaft 69 is rotated to release this safety device as described above, pin 70 in shaft 69 engages and lifts the end 86 of lever 82 and thus allows the end of lock dog finger 79 to move out from under sear finger 62.

This safety device is also provided with means for preventing the reel from relocking during the period that the reel is being unlocked, such relocking, for example, ordinarily occurring if the reel is unlocked at a time when a substantial load, for example 25 lbs., is being exerted on the harness strap or cable; such a load could occur, of course, if the pilot's body is placing a strain on the straps at the same time he is operating the unlocking mechanism. This stress in the webbings would be sufficient at times, when transmitted to the acceleration sensing flywheel, to cause the flywheel to actuate and relock the reel. This lock-up preventing means includes the second U-shaped sear device 57. As the control shaft 69 is rotated to release this safety device from lock-up, as described above, the pin 70, in addition to lifting the end 86 of lever 82, rides over the cam 57' of the second sear 57 and prevents movement of the sear 57 upward, out from the drawing as viewed in FIG. 5. The base of this second sear 57 rests firmly against the thrust plate 46 and thus restrains movement of the thrust plate 46 due to any tendency for relative rotation between the flywheel 41 and the shaft 16. It can therefore be seen that no lockup of this device can occur during the time that the pin 70 extends over the cam 57'. When the control shaft 69, and thus pin 70, are returned to their normal position, the second sear 57 is free to move, and thus the automatic lock feature is returned to normal operation.

It is understood that this safety device works on the principle that the inertia flywheel 41 tends to remain stationary when an angular acceleration of the webbing shaft 16 and thrust plate 46 is produced, the rotational movement of the shaft 16 relative to the inertia member 41 resulting in the automatic locking of the webbing. If the webbings 21, 22 are reeled in at excessive speeds, the inertia flywheel will tend to keep rotating when the webbing reels 17, 18 and shaft 16 are brought to a sudden stop by a retarding force acting on the webbings. Any resultant relative rotation between the flywheel 41 and thrust plate 46 may result in a tipping of the sear 56 and automatic locking when it is not desired. An anti-locking apparatus is utilized in this safety device to insure that it does not automatically lock up during strap retraction, regardless of the angular acceleration of the webbing shaft 16. This anti-locking structure comprises the spring member 52, the anti-lock lever 53, and the drive pin 54. A full description of this feature is found in Patent #3,018,065 cited above and will therefore not be repeated.

This device is provided with a novel means which will operate to lock this device independently of the automatic inertia-operated locking means and the manual control means 69 and 71. If, for example, the device is utilized in an aircraft provided with ejection seats where the safety device is usually mounted on the seat, the pilot, while preparing for ejection, operates a mechanism (not shown) to release gas under pressure into the manifold 36' through pressure fitting 37. The pressure forces the pistons 39' downwardly, as viewed in FIG. 1, the lower end 39" of the pistons engaging the upper end 33' of the yoke 33 and forcing the yoke 33 downwardly, thus unwinding the strap 28 from the shaft 16 and forcefully winding up the two webbings 21 and 22 on their reels 17 and 18, respectively. When the pressure is introduced into manifold 36' the manifold moves upwardly slightly against the compression of springs 39, causing rod 67', the locking member 67 and pin 66 to be moved to the right, as viewed in FIG. 1, engaging projection 65 and raising the sear 56 to cause the lock dog 77 to engage and lock the ratchet wheel as described above to prevent subsequent unwinding of the straps after the pressure has been released.

This inertia-operated safety device also includes a compensating mechanism comprising the compensator screw 47 which operates as described in the above-cited patent to automatically compensate for variations in effective shaft and webbing radius by changing the angular accelerations at which the device will lock to insure operation of this device at one particular rectilinear acceleration.

It should be noted that each reel 17, 18 is rotatably mounted on the main shaft 16 and is permitted a little less than one full revolution of rotation independent of the shaft 16 and other reel. Thus, as viewed in FIG. 3, web 21 and associated reel 17 can rotate under the urging of spring 23 almost one full revolution in the wind-up or slack take-up direction (clockwise) before the stop member 19 engages the left-hand surface of the lug 26 on the reel 17. As viewed in FIG. 3 the spool is in the full slack take-up position. Because springs 34' and 35' are stronger than springs 23 and 24, the lug 19 on spool 17 is normally against the opposite or right-hand surface of 26. When slack take-up occurs, lug 19 backs away from 26 in the clockwise direction taking up slack in the strap. This feature aids comfort by maintaining a somewhat consistent tension on the straps regardless of pilot position, but, more important, it eliminates strap bunching and tangling which would occur without this feature.

The above-described inertia-operated safety device provides for a manual lock and an automatic lock and for a manual release from both manual and automatic lock. In some instances of use the manual lock and the manual unlock from the lock-up position are not necessary, there only being the requirement that the device be automatically unlocked at all times when an accelerating force of sufficient amplitude to operate the device is not present on the webbings. The novel automatic device utilized to unlock the safety mechanism automatically is shown in FIGS. 9 through 12, it being noted that the following structural elements disclosed above and utilized in the manual unlocking operation are omitted from the device and replaced by a simple friction grip ring 95 and a slightly modified lock dog 77, the main control shaft 69, external control lever 71, inner control lever 72, torque pin 73, dog retraction lever 74, control shaft spring 75, pin 70, spring 52 and lever 53. The C-shaped grip ring 95 is secured in and slidably grips the circumference of a groove in the ratchet wheel 40. This grip ring 95, due to its frictional grip on the wheel 40, senses the direction of rotation of the ratchet wheel 40 and, when the ratchet wheel is turning in a direction such that the straps are being pulled out from the safety device, the dog 77 is urged in a direction to engage the ratchet wheel 40 by the dog spring 78 and the rollers 96 on the ring 95 acting against the projection 97 on the dog 77 (see FIG. 9). When the ratchet wheel rotates in the direction to wind up the straps on the reels, the dog 77 is urged by rollers 96 in a direction to move away from the ratchet wheel 40. Projection 98 acts as a stop for the ring 95 in the clockwise direction. During the period that the straps are moving out from the device at an acceleration less than the predetermined acceleration of operation, the sear arm 62 engaging the finger 79 prevents the lock dog from engaging the ratchet wheel 40. When the predetermined acceleration is reached, the sear 56 is lifted and the lock dog 77 is carried into engagement with the ratchet teeth on the ratchet wheel 40 by the dog spring 78. When the force on the straps is relieved and the ratchet wheel 40 turns in the wind-up rotational direction, the dog 77 is moved away from the ratchet wheel 40 and the sear arm 62 falls behind the finger 79, thus unlocking the reel.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An inertia-operated safety device for mounting in a vehicle to restrain the movement of a body within the vehicle when the body is subjected to accelerated movements relative to the vehicle comprising, a pair of tension members for coupling to the body, a pair of reels on which said tension members are wound, a main shaft on which said reels are rotatably mounted, yieldable resilient means for resiliently coupling said reels to said shaft whereby said reels may rotate relative to said shaft through a predetermined angle, second yieldable resilient means coupled to said shaft tensioned so as to urge said shaft in the direction to rotate said reels in a direction to wind up said tension members thereon, said reels and shaft being rotatable against the tension of the second resilient means in a direction to unwind the tension members from the reels responsive to movements of the body, a flywheel rotatably mounted in axial alignment with said shaft, third yieldable means coupling said flywheel to said shaft to rotate said flywheel in unison with said shaft during rotation thereof in the unwind direction of the reels below a certain acceleration, said third yieldable means yielding during rotation of said shaft at said certain acceleration whereby said shaft rotates relative to said flywheel, locking means operated in response to the yielding of said third yieldable means for locking said shaft against further rotation in the reel unwind direction, said locking means having a normal position it assumes when the reel is in an unlocked condition and a lock position when the reels have been locked against further unwind of the tension members, and means for moving said locking means from said lock position to said normal position.

2. An inertia-operated safety device as claimed in claim 1 wherein said first yieldable resilient means comprises a stop member on each of said reels and lugs on said main shaft adapted to engage said stop members after rotation of said reels in either direction on said main shaft through said predetermined angle, and a spring coupled to each reel for urging said reels in the tension member wind-up direction on said main shaft.

3. An inertia-operated safety device as claimed in claim 1 wherein said first yieldable resilient means comprises an additional tension member wound on said main shaft and compression spring means for urging said last tension member in a direction to unwind said last tension member from said main shaft to cause said shaft to rotate in the wind-up direction for said reels.

4. An inertia-operated safety device as claimed in claim 3 including piston means coupled to said compression spring means for at times forcefully unwinding said last tension member from said main shaft in response to pressure exerted on said piston means.

5. An inertia-operated safety device as claimed in claim 4 wherein said piston means is raranged to operate under gas pressure.

6. An inertia-operated safety device for mounting in a vehicle to restrain the movement of a body within the vehicle when the body is subjected to accelerated movements relative to the vehicle comprising, a pair of tension members for coupling to the body, a pair of reels on which said tension members are wound, a main shaft on which said reels are rotatably mounted, yieldable resilient means for resiliently coupling said reels to said shaft whereby said reels may rotate relative to said shaft through a predetermined angle, second yieldable resilient means coupled to said shaft tensioned so as to urge said shaft in the direction to rotate said reels in a direction to wind up said tension members thereon, said shaft and reels being rotatable against the tension of the second resilient means in a direction to unwind the tension members from the reels responsive to movements of the body, a flywheel rotatably mounted in axial alignment with said shaft, a thrust plate mounted for rotational movement with said shaft, third yieldable means for coupling said thrust plate to said flywheel, said thrust plate driving said flywheel through said yieldable coupling means to rotate said flywheel in unison with said shaft during rotation thereof in the unwind direction of the reels below a certain acceleration, said third yieldable coupling means yielding during rotation of said shaft at said certain acceleration whereby said shaft and thrust plate rotate relative to said flywheel, locking means operated in response to the yielding of said yieldable coupling means for locking said shaft against further rotation in the unwind direction of the reels, said locking means having a normal position it assumes when the shaft is in an unlocked condition and a lock position when the shaft has been locked against further movement in the unwind direction, and means for moving said locking means from said lock position to said normal position.

7. An inertia-operated safety device as claimed in claim 6 wherein said yieldable coupling means includes a plurality of steel balls sandwiched between said thrust plate and said flywheel and nestling in indentations in the surfaces thereof and a spring for urging said thrust plate against said steel balls and flywheel, said steel balls moving out of said indentations on relative rotation between said flywheel and said shaft and thrust plate and producing axial longitudinal movement of said thrust plate against said spring means.

8. An inertia-operated safety device as claimed in claim 6 wherein said first yieldable resilient means comprises a stop member on each of said reels and lugs on said main shaft adapted to engage said stop members after rotation of said reels in either direction on said main shaft through said predetermined angle, and a spring coupled to each reel for urging said reels in the tension member wind-up direction on said main shaft.

9. An inertia-operated safety device as claimed in claim 6 wherein said second yieldable resilient means comprises an additional tension member wound on said main shaft and compression spring means for urging said last tension member in a direction to unwind said last tension member from said main shaft to cause said shaft to rotate in the wind-up direction for said reels.

10. An inertia-operated safety device as claimed in claim 9 including piston means coupled to said compression spring means for at times forcefully unwinding said last tension member from said main shaft in response to pressure exerted on said piston means.

11. An inertia-operated safety device as claimed in claim 10 wherein said piston means is arranged to operate under gas pressure.

12. An inertia-operated safety device for mounting in a vehicle to restrain the movement of a body within the vehicle when the body is subjected to accelerated movements relative to the vehicle comprising a tension member for coupling to the body, a reel on which said tension member is wound, a main shaft on which said reel is mounted, said reel being coupled to said shaft whereby said reel rotates with said shaft, yieldable resilient means for resiliently coupling said reel to said shaft whereby said reel may rotate relative to said shaft through a predetermined angle to allow free shoulder movement of the body, a second yieldable resilient means coupled to said shaft tensioned so as to urge said shaft in the direction to rotate said reel in a direction to wind up said tension member thereon to take up slack in the tension member during normal movement of the body, said reel and shaft being rotatable against the tension of said second resilient means in a direction to unwind the tension member from the reel responsive to outward movements of the body during normal movements of the body, said second yieldable resilient means comprising a second tension member wound on said main shaft and compression spring means for urging said second tension member in a direction to unwind said second tension member from said main shaft to cause said shaft to rotate in the reel wind-up direction during the normal movements of the body.

13. An inertia-operated safety device as claimed in claim 12 including a piston coupled to said compression spring means for at times forcefully unwinding said second tension member from said main shaft in response to pressure exerted on said piston means and conduit means for conducting fluid pressure to said piston to actuate the same.

14. A safety device for mounting in a vehicle to restrain the movement of a body within the vehicle when the body is subjected to relatively high acceleration movement relative to the vehicle comprising a tension member adapted to be coupled to the body, a reel rotatably mounted in said device on which said tension member is wound, a ratchet wheel coupled to said reel, resilient means coupled to said reel for rotating said reel in one direction to wind up said tension member, said reel rotating in the other direction to unwind the tension member responsive to forces exerted by a pull on the tension member, an inertia member rotatably mounted in said device, said inertia member rotating in unison with said reel during rotation thereof in the unwind direction below a predetermined acceleration, said reel rotating relative to said inertia member during rotation of said reel at the predetermined acceleration due to an abnormal acceleration of the tension member, and locking means operated in response to the relative rotation between the reel and inertia member for stopping rotation of said reel in the unwind direction, thereby restraining movement of the body in the vehicle, said last means including a lock dog normally held in an unlocked position during normal operation of the device and tensioned for movement into the locking position with said ratchet wheel upon relative rotation between the reel and inertia member, and means coupled to said reel for sensing the direction of rotational movement of said reel, said locking means operating in response to said sensing means and moving to said normal unlocked position when said reel is rotating in the wind-up direction, thereby automatically unlocking said safety device from said locked condition, said sensing means including a C-shaped grip ring gripping a groove in the peripheral edge of said ratchet wheel, said C ring having an extension member for moving said lock dog out of engagement with said ratchet wheel.

15. An inertia-operated safety device for mounting in a vehicle to restrain the movement of a body within the vehicle when the body is subjected to accelerated movements relative to the vehicle comprising, a tension member for coupling to the body, a rotatably mounted reel on which said tension member is wound, yieldable resilient means for urging said reel in a direction to wind up said tension member thereon, said reel being rotatable against the tension of said resilient means in a direction to unwind the tension member from the reel responsive to movements of the body, a flywheel rotatably mounted in axial alignment with said reel, second yieldable means coupling said flywheel to said reel to rotate said flywheel in unison with said reel during rotation thereof in the unwind direction of the reel below a certain acceleration, said second yieldable means yielding during rotation of said reel at said certain acceleration whereby said reel rotates relative to said flywheel, locking means operated in response to the yielding of said second yieldable means for locking said reel against further rotation in the reel unwind direction, said locking means having a normal position it assumes when the reel is in an unlocked condition and a lock position when the reel has been locked against further unwind of the tension member, means for moving said locking means from said lock position to said normal position, piston means adapted to be operated by gas pressure and coupled to said first yieldable resilient means for at times operating said resilient means to forcefully urge said reel in the wind-up direction, and means coupled to said piston means for operating said locking means to lock said reel against unwinding when said piston means is operated.

References Cited in the file of this patent

UNITED STATES PATENTS

| | | |
|---|---|---|
| 426,436 | Corliss | Apr. 29, 1890 |
| 458,938 | Bloomfield | Sept. 1, 1891 |
| 2,588,037 | Orton | Mar. 4, 1952 |
| 2,883,123 | Finnigan | Apr. 21, 1959 |
| 2,904,286 | Bleck | Sept. 15, 1959 |
| 2,992,790 | Cushman et al. | July 18, 1961 |
| 3,018,065 | Cushman et al. | Jan. 23, 1962 |
| 3,034,093 | Stott | July 10, 1962 |

FOREIGN PATENTS

| | | |
|---|---|---|
| 1,231,466 | France | Apr. 11, 1960 |

OTHER REFERENCES

"Ballistic Harness Inertia Reel" brochure of the Talco Engineering Co., a subsidiary of the Gabriel Co.; Mesa, Arizona, dated April 13, 1959.